(12) United States Patent
Skeet et al.

(10) Patent No.: US 9,190,825 B2
(45) Date of Patent: Nov. 17, 2015

(54) MOLDED TESTABLE LONG TERM SUBSEA ABANDONMENT CAP FOR ELECTRICAL CABLES AND METHOD OF MANUFACTURE

(71) Applicants: Stephen John Skeet, Panama City Beach, FL (US); Andre Joseph Chartier, Panama City, FL (US)

(72) Inventors: Stephen John Skeet, Panama City Beach, FL (US); Andre Joseph Chartier, Panama City, FL (US)

(73) Assignee: Oceaneering International, Inc., Houston, TX (US)

( * ) Notice: Subject to any disclaimer, the term of this patent is extended or adjusted under 35 U.S.C. 154(b) by 198 days.

(21) Appl. No.: 13/944,740

(22) Filed: Jul. 17, 2013

(65) Prior Publication Data
US 2014/0060928 A1 Mar. 6, 2014

Related U.S. Application Data

(60) Provisional application No. 61/695,985, filed on Aug. 31, 2012.

(51) Int. Cl.
*H02G 15/04* (2006.01)
*H02G 1/14* (2006.01)

(52) U.S. Cl.
CPC ............. *H02G 15/043* (2013.01); *H02G 1/14* (2013.01)

(58) Field of Classification Search
USPC ............ 174/74 R, 78, 84 R, 88 R, 84 C, 152; 439/271, 275, 589, 278, 285, 277
See application file for complete search history.

(56) References Cited

U.S. PATENT DOCUMENTS

| | | | |
|---|---|---|---|
| 2,428,323 A | 9/1947 | Winer | |
| 2,827,618 A | 3/1958 | Chapman et al. | |
| 3,017,452 A * | 1/1962 | Rongved | 174/152 GM |
| 3,132,289 A | 5/1964 | Russo | |
| 3,782,458 A | 1/1974 | Slack | |
| 4,425,017 A | 1/1984 | Chan | |
| 4,758,174 A * | 7/1988 | Michaels et al. | 439/281 |
| 4,945,005 A | 7/1990 | Aleckner, Jr. et al. | |
| 4,991,288 A | 2/1991 | Scholz | |
| 5,118,279 A | 6/1992 | Gellert | |
| 5,338,213 A | 8/1994 | Oko | |
| 5,360,329 A | 11/1994 | Lemelson | |
| 6,716,063 B1 * | 4/2004 | Bryant et al. | 439/589 |
| 6,793,530 B2 * | 9/2004 | Walse | 439/606 |

(Continued)

FOREIGN PATENT DOCUMENTS

EP 0 038 644 B1 10/1985

*Primary Examiner* — William H Mayo, III
(74) *Attorney, Agent, or Firm* — Maze IP Law, PC (57) ABSTRACT

An umbilical cable assembly is created by a process which, in an embodiment, fits an abandonment cap onto an end of an electrically conductive cable as well as a polyethylene disc into which a set of connection pins have been pre-molded. The abandonment cap is injection molded onto the end of the electrically conductive cable where a cylindrical volume of polyethylene is concurrently injection molded to the polyethylene disc. In certain embodiments some of the connection pins are connected to the umbilical's conductive power core. The abandonment cap, fitted to an umbilical exposed end, includes an injection molded, substantially cylindrical volume of polyethylene disposed over the cable sheath; the disc in which a set of connection pins have been pre-molded; the concurrently injection molded, substantially cylindrical volume of polyethylene disposed over the disc; and a protective cover disposed at least partially over the disc proximate an exposed end of the umbilical's conductive power core.

18 Claims, 6 Drawing Sheets

(56) References Cited

U.S. PATENT DOCUMENTS

| | | | |
|---|---|---|---|
| 6,863,544 B2 * | 3/2005 | Haehn et al. | 439/76.1 |
| 7,229,325 B1 * | 6/2007 | Flynn et al. | 439/814 |
| 7,325,252 B2 * | 1/2008 | Bunker et al. | 726/25 |
| 8,337,227 B2 * | 12/2012 | Arai et al. | 439/271 |
| 2004/0047935 A1 | 3/2004 | Moss et al. | |
| 2011/0147047 A1 * | 6/2011 | Madden | 174/126.1 |
| 2012/0142228 A1 | 6/2012 | Rundle | |

* cited by examiner

MOLDED TESTABLE LONG TERM SUBSEA ABANDONMENT CAP FOR ELECTRICAL CABLES AND METHOD OF MANUFACTURE

This application relates to and claims the benefit of U.S. Provisional Application 61/695,985 filed on Aug. 31, 2012.

FIELD OF THE INVENTION

The invention relates to subsea connectors, more especially to caps used subsea for electrical cables.

BACKGROUND

Umbilicals, such as those used subsea, and their components often need to be accessible for performance monitoring during the installation process. In many cases those same components need to be sealed from seawater ingress prior to final overboading from the installation vessel. Therefore special sealing caps, often known as abandonment caps are assembled onto the previously exposed ends of the cables.

The abandonment caps currently used use resins and oils that are problematic to transport offshore and by air due to their chemical nature, the resins also have a limited shelf life. Current products are those that utilize tapes, adhesives, resins and heatshrink sleeving, these are notoriously unreliable due to the dissimilar materials used for sealing which leave an interface for leakage. Their success also relies on the fitter's skill and attention to detail. In addition they do not facilitate testing while fitted to the cable.

Current art cables are typically manufactured with low density polyethylene conductor insulation rather than ethylene propylene copolymer (EPC) insulation. Low density polyethylene has a lower melt index making the molding process more difficult to accomplish because of washing away of the insulation and push over of conductors during the injection process. This problem would be more pronounced the smaller the conductor size.

A current cap design incorporates an epoxy resin that requires a minimum cure time of 4 hours. Therefore, for a typical umbilical with multiple MV power cores and LV cables, even when using multiple technicians assembling caps as parallel activities, the elapsed time is significant. It can easily be in excess of 12 hours per umbilical. For a project with multiple umbilicals the time taken to fit these caps represents a significant additional vessel time and therefore cost. Additionally, this process requires the umbilical to remain in a position hanging off the back of the installation vessel for those 12 hours while the caps are installed. This is not a preferred situation from the perspective of risk and fatigue accumulation in the umbilical.

DESCRIPTION OF PREFERRED EMBODIMENTS

Figure 1:
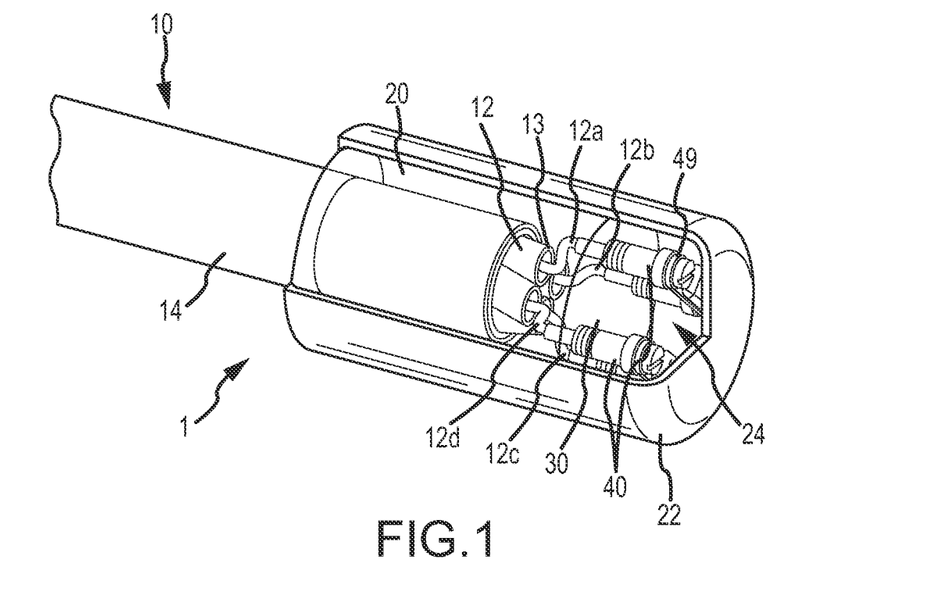
FIG. 1 is a cutaway view in partial perspective of an LV cable assembly.

Referring now to FIG. 1, abandonment cable cap 20 provides a robust and water resistant solution when compared to many of the alternative molded solutions which often employ molded polyurethane (PU) parts which cannot be properly bonded to the polyethylene (PE) outer sheath of the cables. In embodiments, a cylindrical volume of polyethylene is injection molded over a cable sheath and concurrently to a disc in which a solid copper or brass pin have been pre-molded.

Umbilical cable assembly 1 comprises an electrically conductive cable 10 and abandonment 20 cap fitted to exposed end 13 of electrically conductive cable 10.

Electrically conductive cable 10 typically comprises cable sheath 14, typically comprising polyethylene, and one or more conductive power cores 12 disposed within the cable sheath 14, e.g. power cores 12a-12d.

Abandonment cap 20 comprises an injection molded, substantially cylindrical volume of polyethylene disposed over cable sheath 14; disc 30, in which one or more connection pins 40 have been pre-molded, a predetermined subset of the set of connection pins 40 being operatively in electrical communication with a corresponding set of conductive power cores 12; a concurrently injection molded, substantially cylindrical volume of polyethylene disposed over disc 30; and protective cover 22 disposed at least partially over disc 30 proximate an exposed end of conductive power core 12, e.g. exposed end 13.

In certain embodiments, conductive power core 12 is configured as a medium voltage (MV) electrical cable configured to handle between around 3.3 kilovolts (kV) to around 36 kV. In other embodiments, conductive power core 12 is configured as a low voltage (LV) electrical cable configured to handle between around 600 V to around 3.3 kV.

Figure 2:
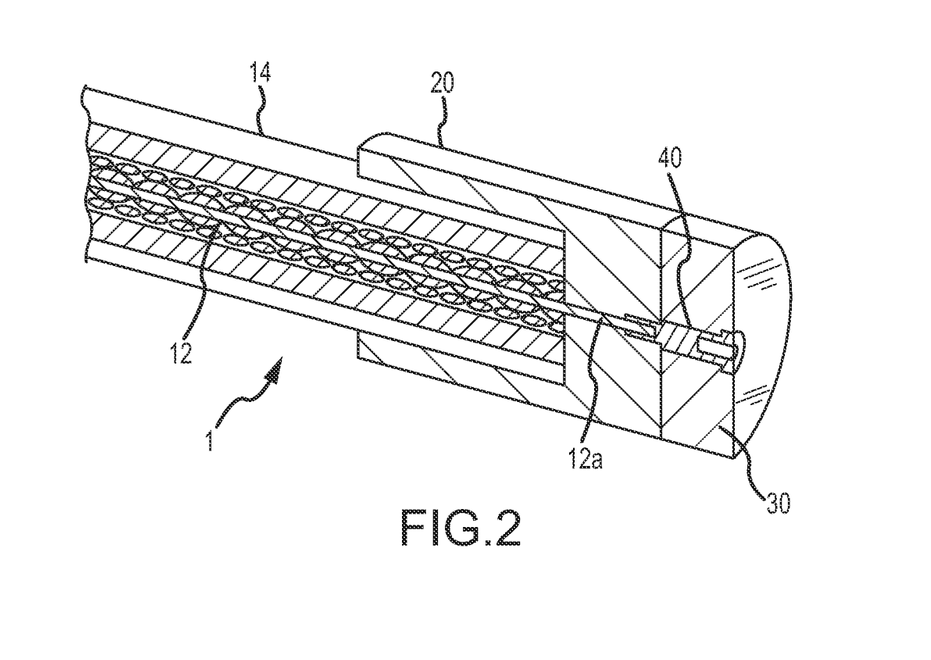
FIG. 2 is a cutaway view in partial perspective of an MV cable assembly.

Conductive power core 12 may further comprise a plurality of conductive power cores 1212a-12d (four shown in FIG. 1 but other numbers, e.g. two, or three, can be configured). In these embodiments, a predetermined subset of conductive power cores 12a-12d is operatively in communication with a predetermined corresponding subset of the set of connection pins 40. As further illustrated in FIG. 2, conductive power core 12 may further comprise a single conductive power core 12a.

Protective cover 22 may comprise gel 24, which may be either a hydrophobic or a hydrophilic gel, which substantially fills protective cover 22. In these embodiments, the gel filled cover 22 may further comprise polymeric seal (not shown) configured to prevent seawater ingress to cap 20.

If no electrical testing is required or electrical testing from a single end only is required, a simpler assembly without connection pin 40, abandonment cap 20, or protective cover 22 can be molded. This can be configured open or short circuit.

Figure 3:
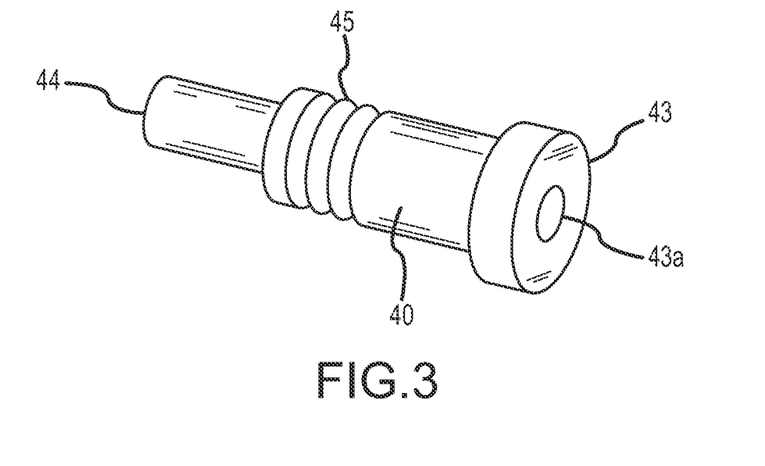
FIG. 3 is a view in partial perspective of an exemplary conductor pin.

Referring additionally to FIGS. 3, 4a, 4b, 5a, and 5b, one or more connection pins 40 may comprise crimping end 44, comprising either a substantially smooth barrel or, as illustrated, a barrel comprising one or more ridges 45, and outside face 43 which can further comprise channel 43a dimensioned to accept a test lead (not shown in the figures), e.g. by having the test lead be secured into channel 43a such as by a screw or other fastener. Typically, the set of connection pins 40 comprises between one connection pin 40 (FIG. 4a) and four connection pins 40 (FIG. 4b) where, in embodiments, one or more connection pins 40 comprises a solid metal connection pin 40 (FIG. 3). The use of a solid metal connection pin 40 allows the connection of a test lead to outside face 43 of completed abandonment cap 20 to provide full installation testing. Further, a predetermined subset of the set of solid metallic connection pins 40 may then be attached to corresponding ends of a central strand of conductive power core 12, e.g. 12a-12d (FIG. 1), such as by crimping at their respective crimping ends 44.

Figure 6:
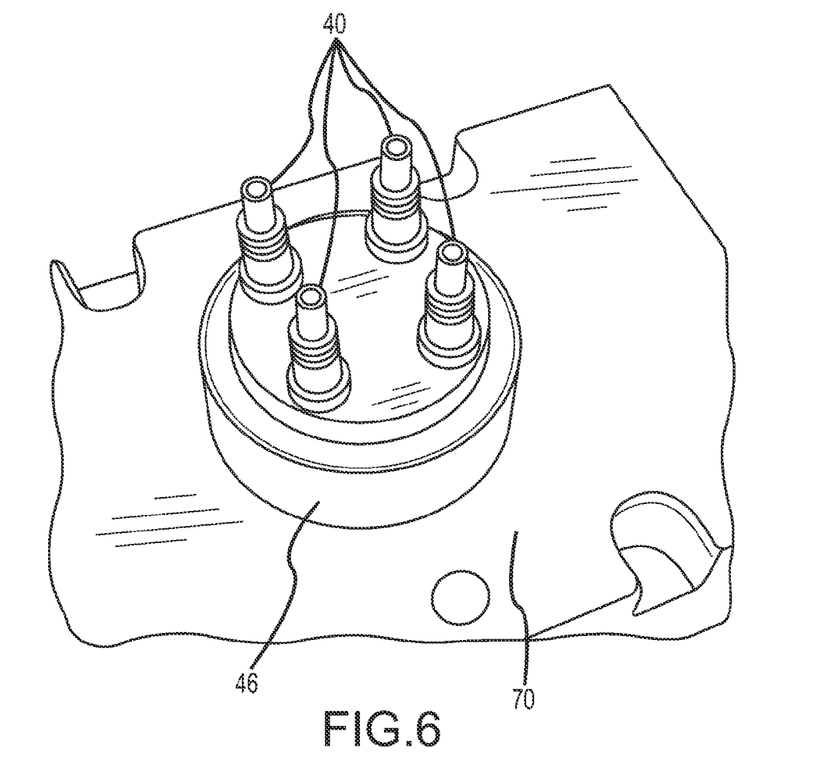
FIG. 6 illustrates penetrator pins assembled to molding tool heating plate.

Referring additionally to FIG. 6, in certain embodiments the set of connection pins 40 may comprise a set of solid metallic pins 40. Use of connection pins 40 machined from solid piece 46 helps ensure a substantially water-blocked connection with conductor power core 12 (FIG. 1) such that penetration of water into conductor power core 12 (FIG. 1) is inhibited axially along its length. The solid metal may be any appropriate metal such as brass, copper, or the like, or a combination thereof. Typically, the solid metal comprises solid metal piece 46 and the set of connection pins 40 comprises connection pins 40 machined from solid metal piece 46.

Figure 7:
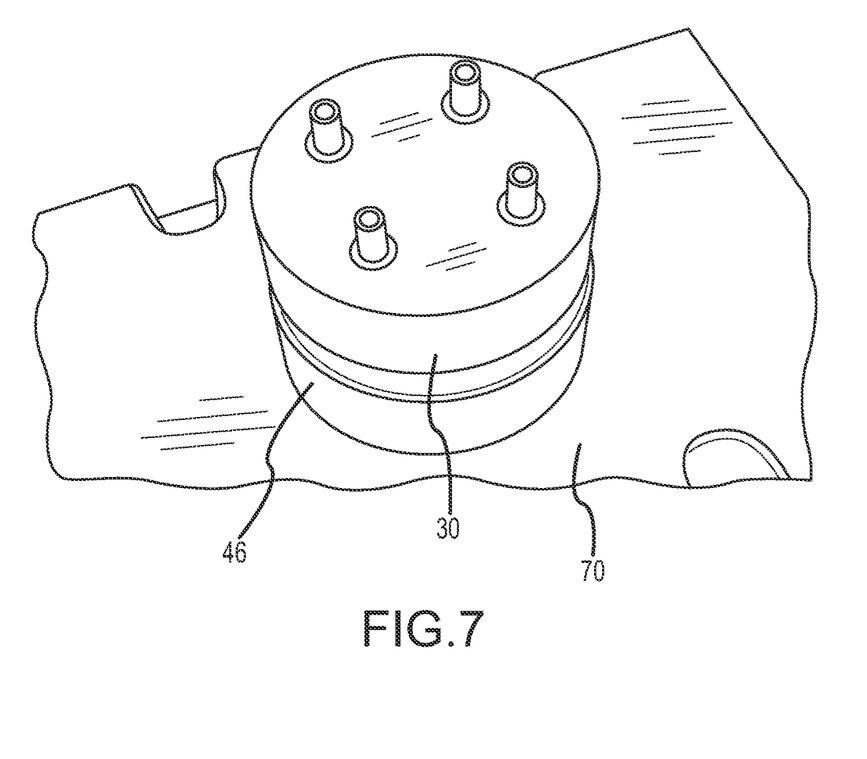
FIG. 7 illustrates a machined disc pre-form fitted over conductor pins.

Referring additionally to FIG. 7, in certain embodiments, disc 30 comprises a set of connection pins 40 molded as a sub-assembly into a suitable material such as polyethylene. In certain of these embodiments, the set of connection 40 pins may be molded as a sub-assembly into disc 30 where disc 30 is configured to hold the set of connection pins 40 in a set of predetermined locations.

In the operation of various embodiments of the manufacturing methods, in general, an abandonment cap such abandonment cap 20 (FIGS. 1, 2) may be created by utilizing extrusion/compression molding carried out using a process that is closely controlled and monitored using appropriate controls and tooling, such as purpose made tools, to help ensure repeatable amalgamation of an injected polymer to a cable jacket such as cable sheath 14 (FIG. 1) and to an outside surface of a set of connector pins 40 (FIGS. 1, 2) which, as described below, may be pretreated. In some embodiments, a high integrity may be achieved due to a substantially complete amalgamation of the encapsulation with the cable sheath 14 (FIGS. 1, 2) and bonding to the connection pins 40, e.g. such as by using pre-treatments.

As more fully described herein below, in a first embodiment abandonment cap 20 is molded into position and fully tested prior to delivery of the umbilical, removing the need for either expensive and large cable connectors to be used or for the fitting of non-testable molded abandonment caps during the installation process that adds significantly to the installation vessel time and increases the risk of damage to the umbilical during the installation process.

The proposed abandonment cap is fitted to the conductor and fully tested prior to the delivery of the umbilical system. This is a significant advantage over a number of designs that are currently employed which can only be fitted to the cable during the final deployment of the umbilical thus represent significant extremely expensive delays offshore and the risk of being forced to deploy the cable fitted with an abandonment cap that has not been possible to test.

In addition, the invention provides the means of allowing electrical testing from either end of the cable to take place with abandonment cap 20 in situ.

Again referring generally to FIG. 1, an umbilical cable assembly may be manufactured by fitting abandonment cap 20 onto an exposed end of electrically conductive cable 10, e.g. exposed end 13 of conductive power core 12. Electrically conductive cable 10 typically comprises one or more conductive power cores 12 over which cable sheath 14 has been disposed and disc 30 further comprising a set of connection pins 40 have been pre-molded into disc 30. As noted above, cable sheath 14 typically comprises polyethylene. The set of connection pins 40 are operatively attached to conductive power core 12 and abandonment cap 20 is injection molded onto end 13 of electrically conductive cable 12.

The injection process typically comprises injection molding a cylindrical volume of a suitable material such as polyethylene over cable sheath 14 and concurrently injection molding the cylindrical volume of a suitable material such as polyethylene to disc 30 to form protective cover 22. Injection molding may further comprise extrusion/compression molding carried out in a closely controlled and monitored manner using purpose made controls and tooling. Protective cover 22 may comprise a polymeric seal to substantially prevent seawater ingress into cap 20, where gel 24 may comprise either a hydrophobic or a hydrophilic gel.

The set of connection pins 40 may be molded into disc 30 as a sub-assembly. In some embodiments the sub-assembly is placed in closed heated mold 80 (FIG. 8); cable sheath 14 is clamped securely to allow pressure to build within mold 80; a polymer such as polyethylene is injected to encapsulate cable sheath 14, conductive power core 12, and the set of connection pins 40.

Typically, there are between one and four connection pins 40, and one or more of connection pins 40 may comprise a solid metal pin which may comprise brass or copper or the like, such as a solid metal 40 machined from solid metal bar 46 (FIG. 6).

Further, each connected connection pin 40 may be crimped onto an end of metal conductors 12 (FIG. 1), e.g. 12a-12d (FIG. 1), at end 44 (FIG. 3).

Additionally, connection pins 40 are typically pre-molded into disc 30 to allow disc 30 to accurately hold each such connection pin 40 in a required location.

Figure 8:
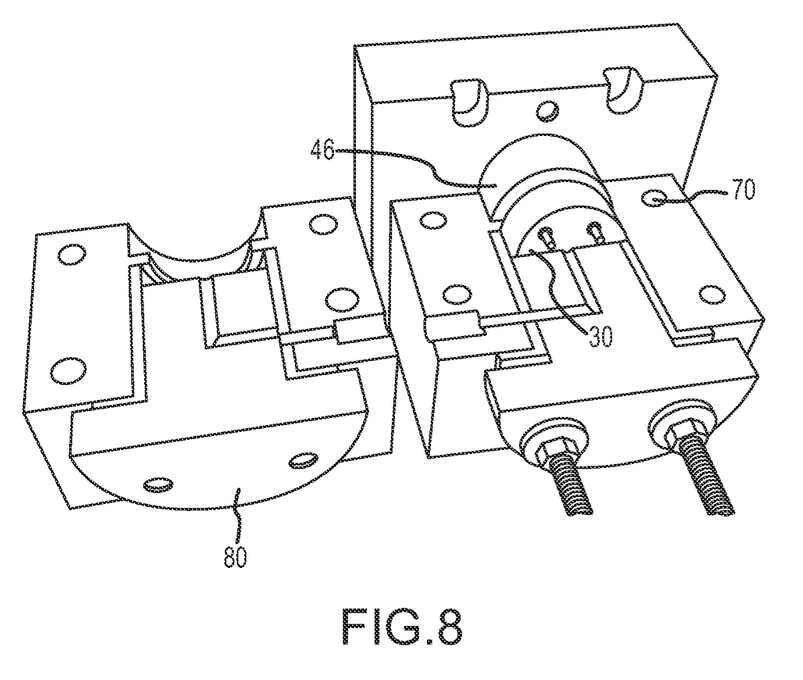
FIG. 8 illustrates a pre-form shown in a molding tool.

Cable sheath 14 may be cooled inboard of mold 80 (FIG. 8). Further, mold 80 may be cooled after mold 80 is filled to a predetermined level such as substantially completely filled. Typically, a suitable polymer is continuously injected into mold 80 during cooling to minimize shrinkage of abandonment cap 20 during cooling. In some embodiments, a closely controlled temperature may be used to activate a bonding agent.

Figure 4A:
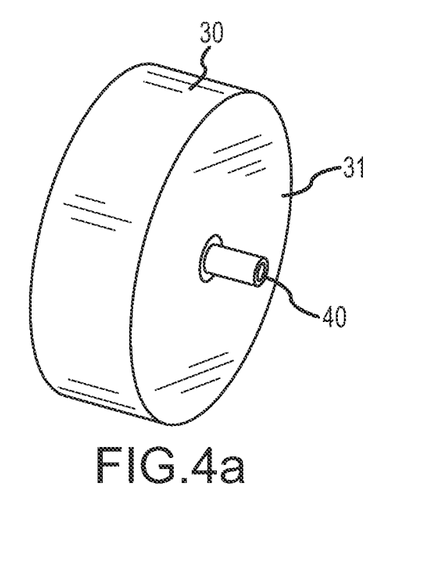
FIGS. 4a and 4b are partially perspective views of an exemplary disc with a single pin.
Figure 4B:
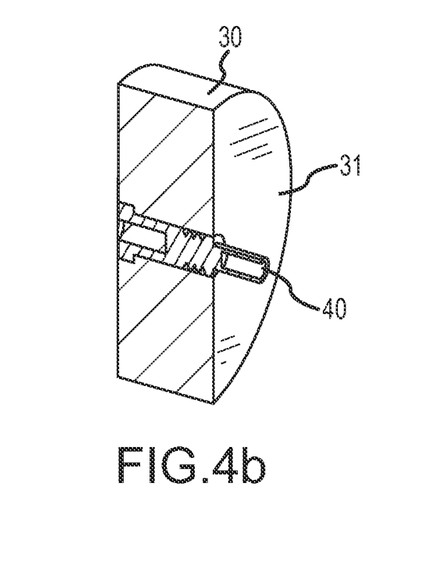
Figure 5A:
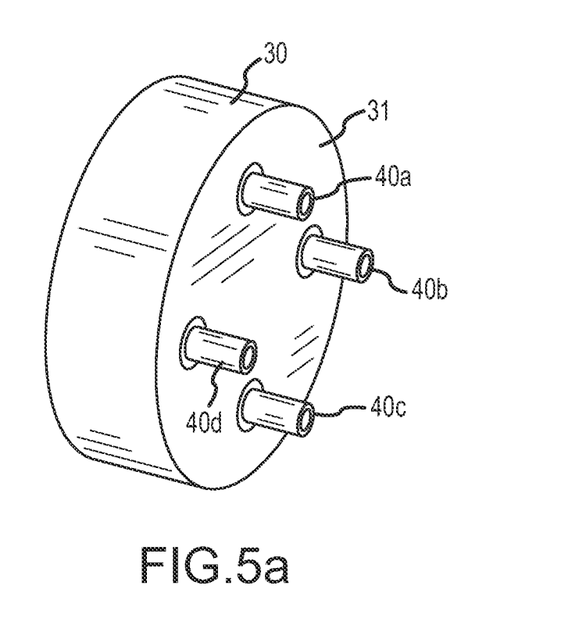
FIGS. 5a and 5b are partially perspective views of an exemplary disc with multiple pins.
Figure 5B:
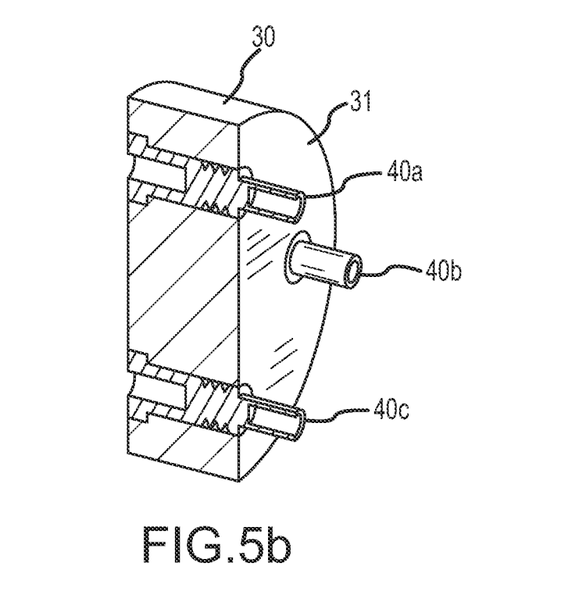

In a typical embodiment a primary benefit of the invention is that it uses molded polyethylene for the main body of abandonment cap 20. During the molding operation, the polyethylene fully amalgamates with outer sheath 14, also comprising polyethylene, and rear face 31 (FIG. 4a, FIG. 5a). As a result, the fully molded abandonment cap 20 presents no open joint at either transition to conductive power core 12 through which water could penetrate.

Molding may be carried out using a portable electronically controlled extruder and temperatures used by the molding apparatus and accumulator are accurately controlled using electronic temperature controllers and thermocouples.

While primarily intended to be fitted to a cable prior to it leaving a manufacturing plant, in embodiments equipment used for molding may be transported offshore, whether or not using portable electronically controlled extruder. In these embodiments, the process may be carried out on an offshore platform or vessel.

In certain embodiments, water may be used for cooling a clamp. Typically, clamp cooling water flow is controlled by a flowmeter and the clamp temperature is monitored using a hand held digital thermometer.

After the injection molding has completed, cable 10 and abandonment cap 20 may be tested electrically. Although the method above is for a single end 13 of cable 10, the process may be repeated for an opposing second end of cable 10. In such a process, cable 10 may be electrically tested from either end. Further, electrical testing may be performed with abandonment cap 20 in situ, whether or not from one or two ends 13.

In additional contemplated processing, metallic parts such as connection pins 40 may be pretreated with a heat activated primer. Alternatively, an acrylic acid-propylene copolymer may be incorporated within the bulk polyethylene that will be molded to form the main volume of protective cap 20. If used, the acrylic acid-propylene copolymer is typically mixed in a proportion of approximately $1/100$ with the polyethylene.

In other contemplated embodiments, a predetermined arrangement of shorting pins 49 (FIG. 1) may be fitted to exposed ends 43 of the connection pins 40 such as with machine screws. This can occur after testing, if testing is conducted. If an electrically shorted cable configuration is required, abandonment cap 20, housing shorting links 49, may be sealed by means of an appropriate seal.

A final protective cover 24 may be filled with a gel and final protective cover 22 secured over abandonment cap 20.

The foregoing disclosure and description of the inventions are illustrative and explanatory. Various changes in the size, shape, and materials, as well as in the details of the illustrative construction and/or a illustrative method may be made without departing from the spirit of the invention.

The invention claimed is:

1. An umbilical cable assembly, comprising:
 a. an electrically conductive cable, comprising:
  i. a cable sheath; and
  ii. a conductive power core disposed within the cable sheath, the conductive power core comprising an exposed end; and
 b. an abandonment cap fitted to the exposed end, the abandonment cap comprising:
  i. an injection molded, substantially cylindrical volume of polyethylene disposed over the cable sheath;
  ii. a disc in which a set of connection pins have been pre-molded, a predetermined subset of the set of connection pins being operatively in electrical communication with the conductive power core;
  iii. a concurrently injection molded, substantially cylindrical volume of polyethylene disposed over the disc; and
  iv. a protective cover disposed at least partially over the disc proximate the exposed end of the conductive power core.

2. The umbilical cable assembly of claim 1, wherein the cable sheath and the disc each comprise polyethylene.

3. The umbilical cable assembly of claim 1, wherein the conductive power core is configured as a medium voltage (MV) electrical cable configured to handle between around 3.3 kilovolts (kV) to around 36 kV.

4. The umbilical cable assembly of claim 1, wherein the conductive power core is configured as a low voltage (LV) electrical cable configured to handle between around 600 V to around 3.3 kV.

5. The umbilical cable assembly of claim 1, wherein the conductive power core comprises a plurality of conductive power cores, a predetermined subset of the conductive power cores operatively in communication with a predetermined subset of the set of connection pins.

6. The umbilical cable assembly of claim 1, wherein the set of connection pins comprises a set of solid metallic pins.

7. The umbilical cable assembly of claim 6, wherein a predetermined subset of the set of solid metallic pins is crimped onto corresponding ends of a central strand of the conductive power core.

8. The umbilical cable assembly of claim 1, wherein the disc in which the set of pins have been premolded comprises a set of connection pins molded as a sub-assembly.

9. The umbilical cable assembly of claim 1, wherein the disc in which the set of pins have been premolded comprises a set of connection pins molded as a sub-assembly into a disc configured to hold the set of connection pins in a set of predetermined locations.

10. The umbilical cable assembly of claim 1, wherein the set of connection pins comprises between one and four connection pins.

11. The umbilical cable assembly of claim 1, wherein the set of connection pins comprises connection pins comprising a solid metal.

12. The umbilical cable assembly of claim 11, wherein the solid metal comprises at least one of brass or copper.

13. The umbilical cable assembly of claim 12, wherein:
 a. the solid metal comprises a solid metal bar; and
 b. the set of connection pins comprises connection pins machined from the solid metal bar.

14. The umbilical cable assembly of claim 1, further comprising the protective cover comprises a gel filled protective cover, the gel filled cover comprising a polymeric seal configured to prevent seawater ingress to the shorting links.

15. The umbilical cable assembly of claim 14, wherein the gel comprises either a hydrophobic or a hydrophilic gel.

16. The umbilical cable assembly of claim 1, further comprising a seal disposed intermediate the protective cover and the disc.

17. The umbilical cable assembly of claim 16, wherein the seal further comprises a plurality of seals disposed intermediate the protective cover and the disc.

18. The umbilical cable assembly of claim 1, wherein the protective cover further comprises a sealing plug disposed proximate an exposed surface of the protective cover.

* * * * *